June 21, 1966 V. H. SIEGEL 3,257,659

COUNTER-DETECTION SYSTEM

Filed Dec. 3, 1963

INVENTOR.
VERNON H. SIEGEL

BY

*LeBlanc and Shur*

ATTORNEYS 3,257,659
COUNTER-DETECTION SYSTEM
Vernon H. Siegel, Snyder, N.Y., assignor to Radatron Research & Development Corp., North Tonawanda, N.Y., a corporation of New York
Filed Dec. 3, 1963, Ser. No. 327,703
2 Claims. (Cl. 343—18)

This invention relates to a counter detection system and more particularly to an arrangement for ascertaining when a continuous wave signal such as a radar or other microwave transmission is being detected by electronic equipment.

As is well known, Doppler radar and various other high frequency continuous wave signals are used to monitor events such as the well known S and X band police radar for monitoring automotive speed and the military surveillance radar often used in Doppler form to detect the movement of any enemy vehicles and/or personnel. More recently, various detecting devices have been provided for detecting these Doppler radar signals so that the persons being monitored by the radar may know that they are under surveillance and take appropriate action if any is required. Perhaps the most well known and the most publicized of these detectors are the small microwave detectors for automobiles used to warn a motorist of a police radar installation. However, of equal importance are the use of similar radar detectors by the military for detecting enemy radar installations.

The present invention is directed to a counter detection system for these detector devices so that the radar installation operator may know that his signal is being detected. The system of the present invention requires a minimum of equipment and modification of the basic Doppler radar installation and may be used both by police and military personnel. The counter detection system of the present invention is of particular importance in military applications in view of the fact that it is a more or less common expedient to avoid being detected by Doppler radar through simply standing still and remaining immobile so that no velocity caused difference frequency is produced. With the novel system of the present invention, the counter detection system will give an indication of the presence of an enemy detector irrespective of the fact that the enemy may be remaining stationary and immobile so as to avoid detection.

It is therefore one object of the present invention to provide a novel microwave counter detection system.

Another object of the present invention is to provide a system requiring a minimum modification of a basic Doppler type surveillance radar installation.

Another object of the present invention is to provide a counter detection system operative to indicate the presence of stationary or immobile radar detectors.

Figure 1:
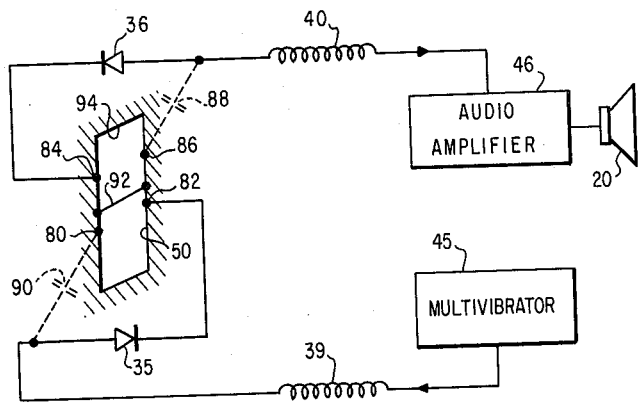
Figure 2:
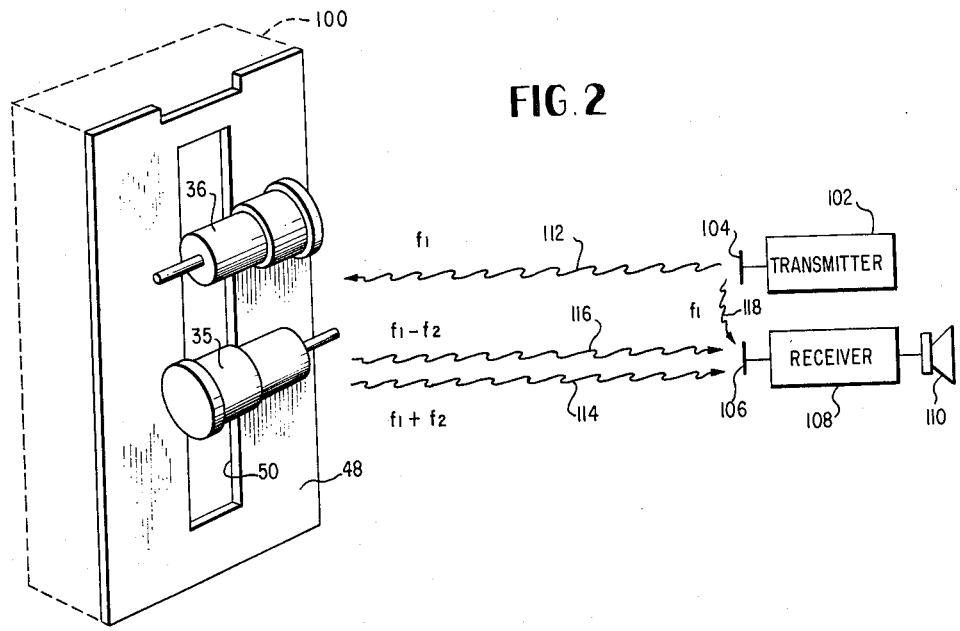

These and further objects and advantages of the invention will be more apparent upon reference to the following specification, claims and appended drawings wherein:

FIGURE 1 is a schematic diagram of a continuous wave microwave detector or checker for which the counter detector system of the present invention is particularly suited, and FIGURE 2 is a schematic diagram of the overall counter detection system of the present invention.

Referring to the drawings, FIGURE 1 shows a microwave detector of the type that may be used in automobiles to detect police radar or may be used by the enemy to detect the presence of a military surveillance radar installation. In FIGURE 1 a microwave antenna generally indicated at 50 comprises a slot proportioned to receive microwave frequencies and across which is connected a detector diode 36 and a modulator diode 35, both preferably of the semiconductor type. The slot is preferably formed in a grounded conductive plate indicated by the cross hatching about the slot 50.

Diode 35 is connected across the slot 50 between terminals 80 and 82 and diode 36 is connected across the slot between terminals 84 and 86. A suitable insulating bushing forms a distributed capacitance 88 between the anode of diode 36 and terminal 86 at the edge of slot 50. A similar insulating bushing forms a distributed capacitance 90 between the anode of diode 35 and terminal 80 as the other edge of slot 50. Suitable shorting bars may be provided across the slot as indicated by the shorting conductor 92 if desired.

The signal checker or detector of FIGURE 1 is capable of detecting signals from two different frequency bands such as the lower S band and the higher X band. At the lower of the two frequencies (to which lower frequency the slot 50 is tuned), diode 36 receives RF energy incident on the slot 50. Diode 35 is alternately energized and deenergized by multivibrator 45. When diode 35 is energized the electrical characteristics of the slot antenna are altered such that some of the energy across the slot antenna passes through diode 35, thereby altering the signal available at diode 36. This is accomplished since diode 36 is located on the slot antenna where the voltage across the slot antenna is other than zero and diode 35 is preferably located somewhere near voltage maximum, i.e. ideally midway between the ends of the slot. Slot antenna 50 is preferably an integral number of half wavelengths and if as preferred the length of the slot is a half wavelength long at the lower frequency, then the center of the slot has a voltage maximum.

For the higher of the two frequency bands, diode 35 is located a distance from the upper edge 94 of the slot such that when diode 35 is energized by the multivibrator, a different length of slot is produced. If energy of the higher frequency band is now received, the voltage of diode 36 is higher when diode 35 is energized than it is when diode 35 is unenergized. With this higher frequency such that the length from upper edge 94 of the slot to diode 35 is approximately one-half wavelength or an integral number of half wavelengths then the voltage at diode 36 is a maximum when diode 35 is energized.

Since the diodes have some series inductance and shunt capacitance the position of diode 35 from the upper edge 94 will not ordinarily be exactly an integral number of half wavelengths.

In operation, in the absence of electromagnetic radiation, no voltage appears between points 84 and 86 of the antenna and no signal appears across distributed capacitance 88. However, if radiation at the lower frequency to which the slot is resonant is present across points 84 and 86, diode 36 rectifies the voltage and a D.C. voltage appears across capacitance 88. This D.C. voltage does not pass through the amplifier 46 to produce an audio output at speaker 20.

When the voltage at the output of multivibrator 45 goes positive a current flows through choke 39 and through diode 35 to the antenna plate which is at ground potential. As the diode 35 conducts, it allows RF energy to flow from terminal 82 to terminal 80 on antenna 50. No high frequency flows to the multivibrator 45 because of the choke coil 39. When energy flows from terminal 82 to terminal 80 the voltage from terminal 84 to terminal 86 is decreased since the frequency of radiation is such that a voltage maximum occurs along the slot antenna near the terminals 80 and 82.

The periodic conduction of diode 35 acts to periodically produce a short between terminals 82 and 80 as the multivibrator 45 drives current through the choke coil 39 and the diode 35. This short is effective to mismatch antenna 50 to the frequency at which the slot is tuned during the time diode 35 is conducting, but allows antenna 50 to be resonant during the off-cycle of diode 35. During this off-cycle more energy passes from terminal 86 to terminal 84 through diode 36 and the distributed capacitance 88.

When the second higher frequency is incident on antenna 50 (which preferably is a frequency different from an exact multiple of the previously described lower frequency) and with the diode 35 turned off the antenna 50 will not be resonant and the voltage appearing across terminals 86 and 84 is not a maximum. However, diode 35 is located on antenna 50 such that when it becomes conductive by means of multivibrator 45 the effective length of the slot from upper edge 94 to terminals 82 and 80 is made to resonate at the second higher frequency and the voltage at terminals 84 and 86 increases. In this way when diode 35 is made conductive the voltage from 86 to 84 will increase in magnitude and therefore a greater voltage will appear across distributed capacitance 88 than appears when diode 35 is turned off. This alternating increase and decrease of voltage across capacitance 88 is amplified in amplifier 46 and actuates speaker 20.

As mentioned before, the effective length of the antenna when diode 35 is conducting will ordinarily be different than the measured distance from upper edge 94 to terminals 82 and 80 since diode 35 has some series inductance and shunt capacity which offers an effective length to the path of current flowing between terminals 82 and 80. The particular positions of the diodes and the size of the slot all have an effect upon the reception and are more critical for the higher of the two frequency bands received. These factors must be determined empirically for the particular frequencies being received, but in general diode 36 is located with respect to the upper edge 94 of the slot in such a position as to get a proper impedance match with the antenna. Diode 35 is located so as to act as a short circuit for the lower frequency and so as to cut the effective length of the slot for the higher frequency. The shorting bars are not essential to the operation and can be omitted, but are useful in providing an effective inductance so as to provide a good impedance match for diode 36. By way of example only in one unit constructed for use with S and X band frequencies, the vertical slot 50 had a width of 0.300 inch and a length of 1.950 inches. Diode 35 was placed across the slot 1.000 inch from the bottom edge of the slot and diode 36 was spaced 0.375 inch above diode 35. In the same device, the antenna plate had an overall width of 3⅝ inches, an overall height of 2¾₁₆ inches and was made from 0.040 inch thick stock.

FIGURE 2 shows the novel counter detection system of the present invention used in conjunction with a signal checker or detector of the type described in FIGURE 1. FIGURE 2 illustrates the detector at 100 in dashed lines constructed in the manner of FIGURE 1 having antenna plate 48 and slot 50 upon which are mounted the diodes 35 and 36. While described in conjunction with the particular detector of FIGURE 1, it is understood that the counter detection system of the present invention may be used in conjunction with other types of continuous wave radar detectors.

In the system of FIGURE 2 a transmitter 102 sends energy by way of an antenna 104 of a frequency $f_1$ to detector 100. Due to interaction in the detector, sum and difference frequency signals are radiated from the detector and impinge on antenna 106 of a receiver 108 connected to a suitable indicator such as a speaker 110. A portion of the microwave energy radiated by antenna 104 also impinges on receiving antenna 106.

The counter detection system of the present invention is based on the fact that in the detector system of FIGURE 1 there is an antenna with two diodes mounted so that they connect across the antenna terminal. In this case one diode, i.e. diode 35 is alternately turned on and off at an audio or other low frequency rate. The effect of this diode is to alternately short the antenna terminals so that if RF energy is present at the antenna then the RF energy applied to the other diode, i.e. diode 36, is modulated and the output from diode 36 is varied in amplitude so that an audio or other low frequency signal is available instead of a D.C. signal.

However, it is to be noted that the diode 35 is in the presence of RF signals. During the time the diode 35 is turned on, RF energy flows through this diode and since the diode is a nonlinear element, a mixing of the RF signal and the low frequency or audio signal results. This produces two other frequencies in addition to the RF frequency and the audio frequency in a well known manner, one of the other frequency signals being the sum of the RF and AF signals and the other being the difference between the RF and the AF signals.

In FIGURE 2 the impinging signal 112 having a frequency $f_1$ produces in the mixer diode 35 the sum and difference frequency signals 114 and 116 which are radiated by the antenna back to the source of the original signal 112. In the receiver one of the signals 114 or 116 is beat against the direct signal 118 from antenna 104 to produce an audio output in speaker 110. It is apparent that the counter detection system makes it possible for the operator of the transmitter 102 to have an indication on his receiver 108 any time that a detector is detecting the signal from his transmitter.

The system of FIGURE 2 is particularly suited for use in conjunction with police speed radar and makes it possible for a policeman to know when a detector in an approaching car is detecting his signal. The system is also extremely useful in conjunction with military radar, particularly the type known as personnel surveillance radar. For example, surveillance radar often in the form of a Doppler type radar is used to detect the presence of enemy vehicles and/or personnel. It is a more or less common expedient to avoid being detected by such radar by simply standing still and remaining immobile so that no velocity caused difference frequency is produced. With the system of the present invention it is possible for the surveillance radar operator to have an indication of the presence of an immobile enemy detecting his signal even though no velocity caused difference frequency is produced since the detector itself produces a difference frequency which can be indicated at the receiver.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A counter detection system comprising a microwave transmitter and receiver each including an antenna, a continuous wave detector including a microwave antenna, a modulator diode and a detector diode physically mounted on and supported by said microwave antenna, distributed capacitive means coupling said diodes to opposite sides of said microwave antenna, oscillator means coupled to said modulator diode for periodically rendering said modulator diode conductive, means including said distributed capacitive means for deriving a demodulated output from said detector diode, indicating means coupled to said detector diode, means for transmitting a first signal from said transmitter to both said microwave receiver and said continuous wave detector, said continuous wave detector radiating a second signal generated in said modulator diode and differing in frequency from said first signal by an amount equal to the frequency of said oscillator means, and means in said microwave receiver for detecting said second signal.

2. A counter detection system according to claim 1 wherein said microwave antenna is a slot antenna formed in a conductive plate and said diodes are mounted on said plate and extend across said slot.

References Cited by the Examiner
UNITED STATES PATENTS

| | | |
|---|---|---|
| 2,193,102 | 3/1940 | Kock. |
| 2,461,646 | 2/1949 | Lewis _____ 343—6.8 |
| 2,539,476 | 1/1951 | Rines. |
| 2,582,310 | 1/1952 | Chireix _____ 343—6.5 |
| 2,812,428 | 11/1957 | Rath. |
| 2,899,546 | 8/1959 | Hollmann _____ 343—6.8 |
| 2,943,189 | 6/1960 | Crump _____ 343—6.8 X |
| 2,950,473 | 8/1960 | Gutton _____ 343—6.8 X |
| 2,958,781 | 11/1960 | Marchal et al. _____ 343—6.8 X |
| 3,094,663 | 6/1963 | Siegel _____ 324—364 |

CHESTER L. JUSTUS, *Primary Examiner.*

LEWIS H. MYERS, *Examiner.*

E. T. CHUNG, *Assistant Examiner.*